(12) United States Patent
Chatterjee et al.

(10) Patent No.: US 8,732,411 B1
(45) Date of Patent: May 20, 2014

(54) DATA DE-DUPLICATION FOR INFORMATION STORAGE SYSTEMS

(75) Inventors: Paresh Chatterjee, Fremont, CA (US); Srikumar Subramanian, Fremont, CA (US); Sharon Enoch, Newark, CA (US); Raghavan Sowrirajan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 926 days.

(21) Appl. No.: 12/274,000

(22) Filed: Nov. 19, 2008

Related U.S. Application Data

(60) Provisional application No. 61/003,671, filed on Nov. 19, 2007.

(51) Int. Cl.
*G06F 12/00* (2006.01)
*G06F 13/00* (2006.01)
*G06F 13/28* (2006.01)

(52) U.S. Cl.
USPC ............ 711/147; 711/170; 711/162; 711/161

(58) Field of Classification Search
None
See application file for complete search history.

(56) References Cited

U.S. PATENT DOCUMENTS

| | | | |
|---|---|---|---|
| 4,942,579 A | 7/1990 | Goodlander et al. | |
| 5,257,367 A | 10/1993 | Goodlander et al. | |
| 5,720,027 A | 2/1998 | Sarkozy et al. | |
| 5,732,238 A | 3/1998 | Sarkozy | |
| 5,790,774 A | 8/1998 | Sarkozy | |
| 5,893,919 A | 4/1999 | Sarkozy et al. | |
| 5,974,426 A | 10/1999 | Lee et al. | |
| 5,990,810 A | 11/1999 | Williams | |
| 6,098,128 A | 8/2000 | Velez-McCaskey et al. | |
| 6,502,166 B1 | 12/2002 | Cassidy | |
| 7,089,448 B2 | 8/2006 | Hinshaw et al. | |
| 7,536,529 B1 | 5/2009 | Chatterjee et al. | |
| 7,822,939 B1 * | 10/2010 | Veprinsky et al. | 711/170 |
| 2002/0161983 A1 | 10/2002 | Milos et al. | |
| 2003/0105923 A1 | 6/2003 | Bak et al. | |
| 2003/0163630 A1 | 8/2003 | Aasheim et al. | |
| 2005/0102551 A1 | 5/2005 | Watanabe | |

OTHER PUBLICATIONS

U.S. Appl. No. 11/254,347, filed Oct. 20, 2005, entitled "Method, System, Apparatus, and Computer-Readable Medium for Provisioning Space in a Data Storage System," Inventors: Chatterjee et al.

(Continued)

*Primary Examiner* — Reginald Bragdon
*Assistant Examiner* — Stella Eun
(74) *Attorney, Agent, or Firm* — Meunier Carlin & Curfman, LLC

(57) ABSTRACT

Technologies for eliminating duplicate data within a storage system can efficiently identify and eliminate duplication by remapping borrower regions to share physical storage space with lender regions. Block-level de-duplication can co-exist with storage architectures for thin provisioning and snapshot management. Lending maps can track redirected pointers from borrower regions to shared physical storage from lender regions. The lending maps can track the freed status of regions to support efficient write I/O operations without defaulting to unnecessary read-modify-write cycles to complete data writes. Redundancy of de-duplicated data can maintain one or more copies to support recovery from media errors. Candidate regions for de-duplication can be identified by monitoring the times and patterns of data access operations. A sampled mechanism for calculating and comparing signatures of data blocks can support the efficient identification of duplicated data within the storage system.

20 Claims, 12 Drawing Sheets

(56) References Cited

OTHER PUBLICATIONS

U.S. Official Action dated Sep. 4, 2007 in U.S. Appl. No. 11/254,347.
U.S. Official Action dated Mar. 18, 2008 in U.S. Appl. No. 11/254,347.
U.S. Official Action dated Oct. 8, 2008 in U.S. Appl. No. 11/254,347.
U.S. Appl. No. 11/551,291, filed Oct. 20, 2006, entitled "Providing Redundancy in a Storage System," Inventors: Chatterjee et al.
U.S. Appl. No. 12/101,236, filed Apr. 11, 2008, entitled "Data Migration Between Multiple Tiers in a Storage System Using Age and Frequency Statistics," Inventors: Chatterjee et al.
U.S. Appl. No. 12/101,238, filed Apr. 11, 2008, entitled "Data Migration Between Multiple Tiers in a Storage System Using Pivot Tables," Inventors: Chatterjee et al.
U.S. Appl. No. 12/101,241, filed Apr. 11, 2008, entitled "Allocating Background Workflows in a Data Storage System Using Autocorrelation," Inventors: Chatterjee et al.
U.S. Appl. No. 12/101,251, filed Apr. 11, 2008, entitled "Allocating Background Workflows in a Data Storage System Using Historical Data," Inventors: Chatterjee et al.
U.S. Appl. No. 12/200,279, filed Aug. 28, 2008, entitled "Eliminating Duplicate Data in Storage Systems With Boot Consolidation," Inventors: Chatterjee et al.
U.S. Appl. No. 12/425,123, filed Apr. 16, 2009 entitled "Provisioning Space in a Data Storage System," Inventors: Chatterjee et al.
U.S. Notice of Allowance / Allowability dated Jan. 12, 2009 in U.S. Appl. No. 11/254,347.
U.S. Official Action dated Mar. 20, 2009 in U.S. Appl. No. 11/551,291.
U.S. Official Action dated Oct. 5, 2009 in U.S. Appl. No. 11/551,291.

* cited by examiner

DATA DE-DUPLICATION FOR INFORMATION STORAGE SYSTEMS

CROSS-REFERENCE TO RELATED APPLICATION

This application claims the benefit of U.S. provisional patent application No. 61/003,671, filed on Nov. 19, 2007, entitled "Method, System, Apparatus, and Computer-Readable Medium for Data De-Duplication," which is expressly incorporated herein by reference in its entirety.

BACKGROUND

A growing amount of data generated in modern information systems presents considerable challenges with regard to storing, retaining, and managing information. These challenges have given rise to various data management technologies. For example, capacity planning, thin provisioning, and data reduction techniques are applied to improved efficiency in data storage systems. Data compression techniques have also been leveraged to address the magnitude of data stored by data storage systems.

Data de-duplication, also referred to as "de-dupe," is another approach for improving capacity and efficiency in data storage systems. De-duplication is a data reduction technology that can compact a storage footprint by eliminating multiplicities, or copies, in the stored data. Since storage servers are often required to host files and data from multiple clients and users, many files or data elements may reside as multiple copies within the storage system. The copies may be in various seemingly unrelated folders. Even when each of these files is individually compressed, a great deal of efficiency may be obtained by eliminating the duplicated data elements. De-duplication at the file level can be implemented using hints obtained from file level meta-data to identify de-duplication candidate files. However, when dealing with unstructured data or with multiple versions of files that are different but share many blocks of common data, block level de-duplication may be more beneficial. Block level de-duplication may be far more difficult in environments where data is randomly accessed and altered after it has been de-duplicated.

Another concern in de-dupe implementations is related to having all of the eggs in one basket once multiple copies of a data element have been de-duplicated into one copy. Addressing data loss concerns in high performance block-level de-duplicating data storage systems introduces yet another challenge in implementing de-duplication techniques.

It is with respect to these considerations and others that the disclosure made herein is presented.

SUMMARY

Technologies are described herein for eliminating duplicate data within a storage system. The de-duplication technology presented herein can efficiently identify duplicate data within a data storage system and eliminate duplication by remapping borrower regions to share physical storage space with lender regions. Such de-duplication can support substantial storage space consolidation.

According to one embodiment, an implementation of block level data de-duplication can seamlessly co-exist with storage architectures for thin provisioning and snapshot management. Lending maps can be used to track redirected pointers from borrower regions to shared physical storage from lender regions. Reads and writes to both lender and borrower regions can be efficiently processed.

According to another embodiment, features of the lending maps can support managing and reclaiming freed borrower regions. Tracking the freed state of regions can support efficient write I/O operations without defaulting to read-modify-write cycles for all data writes.

According to yet another embodiment, redundancy of de-duplicated data can be maintained by keeping one or more copies in either a shared or a separate dedicated storage subsystem. This redundancy can support recovery from media errors while providing a reduced recovery time objective. De-duplicated data may also be provided with improved protective features by migrating lender territories to higher cost tiers within a data storage system.

According to yet another embodiment, candidate regions for de-duplication can be identified by monitoring the times and patterns of data access operations. A sampled mechanism for calculating and comparing signatures of data blocks can support the efficient identification of duplicated data within the storage system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
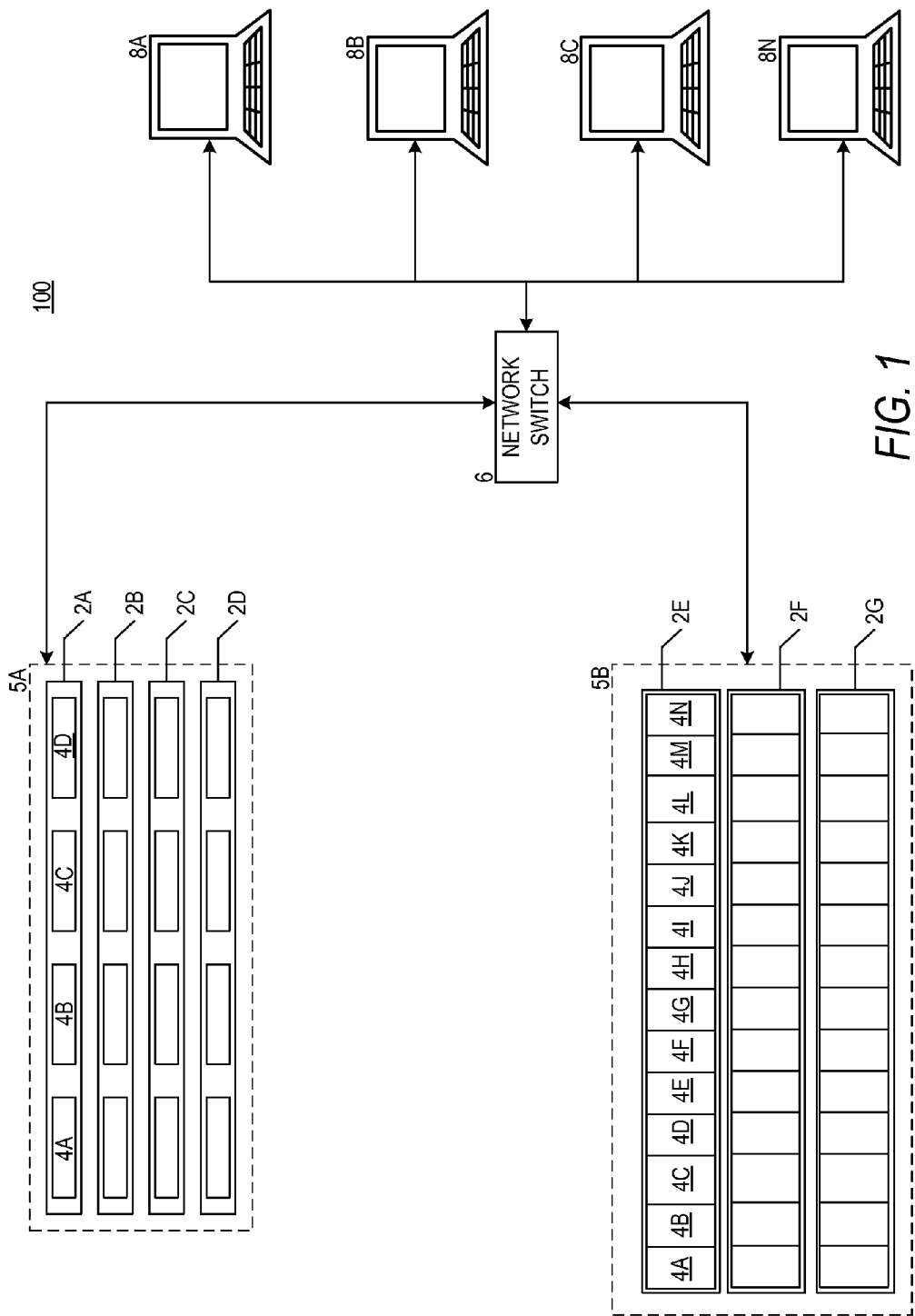
FIG. 1 is a network architecture diagram illustrating aspects of a storage system according to an embodiment presented herein.

The following detailed description is directed to technologies for eliminating duplicated data within a data storage system. Through the use of the embodiments presented herein, technologies for identifying and eliminating duplicated data within a data storage system can increase storage efficiency while maintaining data protection.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for eliminating duplicated data within a data storage system will be described.

Turning now to FIG. 1, details will be provided regarding an illustrative operating environment for the implementations presented herein, as well as aspects of several software components that provide the functionality described herein for data de-duplication within a data storage server. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface (iSCSI) protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Data de-duplication features may be provided on one or more storage server computers 2A-2G, one or more storage clusters 5A-5B, or one or more client computers 8A-8N. Furthermore, the processes for implementing de-duplication may execute on any of these systems or may operate in a distributed fashion with components executing across two or more of these systems.

Figure 2:
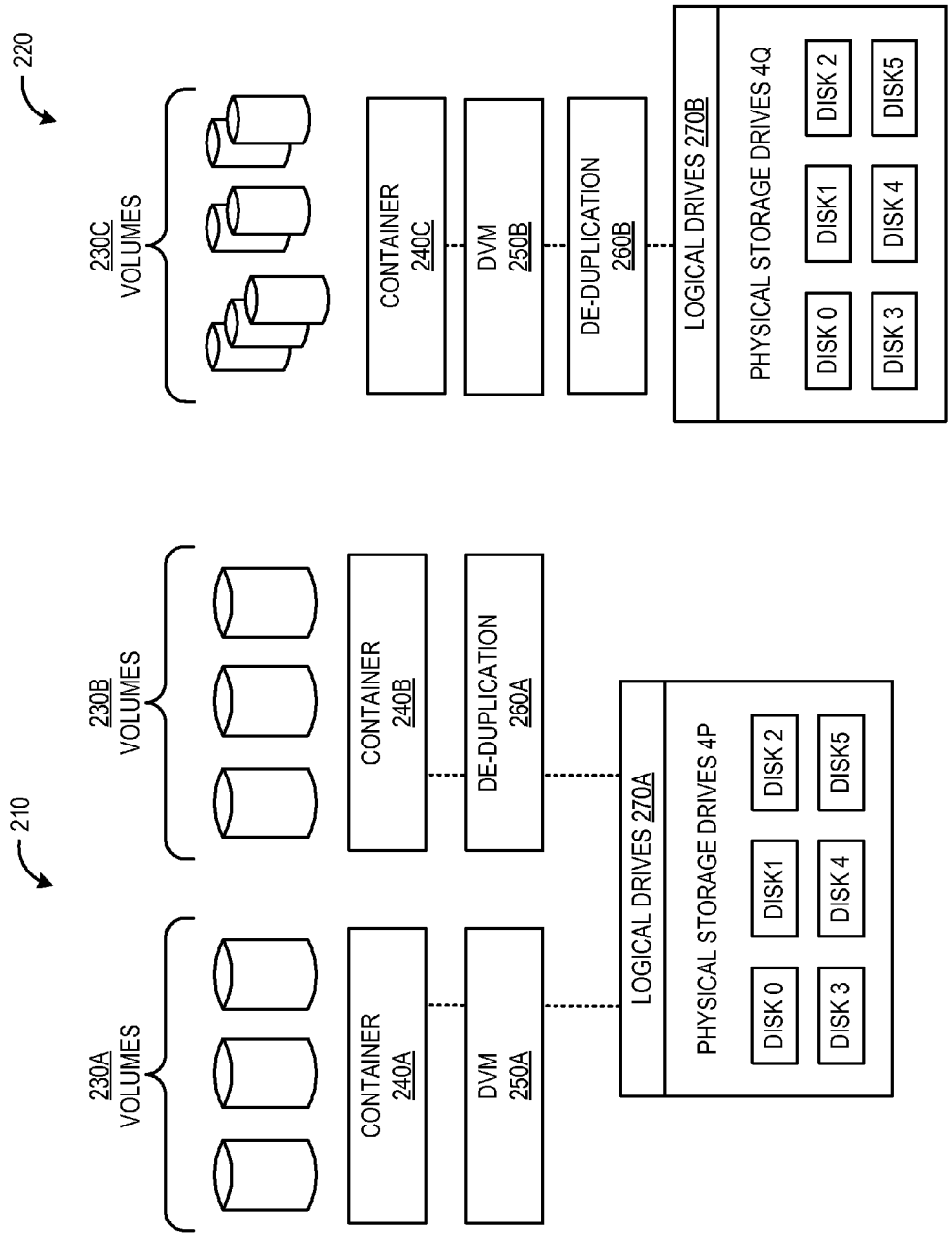
FIG. 2 is a block diagram illustrating two examples of data de-duplication modules operating in conjunction with distributed volume management architectures in data storage systems according to embodiments presented herein.

Referring now to FIG. 2, a block diagram illustrates two examples of a data de-duplication module operating in conjunction with distributed volume management (DVM) architectures in data storage systems according to an embodiment presented herein. A DVM module 250A, 250B can support storage system functionality such as thin provisioning, snapshots, and so forth. A combination architecture 210 can support storage volumes 230A within a container 240A supported by a DVM module 250A. The combination architecture 210 can also support storage volumes 230B within a container 240B supported by a de-duplication module 260A. As such, the combination architecture 210 can support both DVM functionality as well as data de-duplication. The de-duplication module 260A of combination architecture 210 can be provided as a plug-in within a storage stack. The plug-in can be enabled or disabled for any container, thereby differentiating between a DVM class container 240A or a de-dupe class container 240B. Both the DVM class and the de-dupe class may be supported by logical drives 270A abstracted from physical storage drives 4P.

A cascaded architecture 220 can support both data de-duplication and enterprise-class snapshot features. Volumes 230C, and similarly snapshots, within a container 240C may be supported by a DVM module 250B and a de-duplication module 260B. A snapshot layer may be visible to the DVM class but transparent to the de-dupe class. Enterprise class snapshot features along with the data de-duplication technology presented herein can be supported within the cascaded architecture 220. Both the DVM class and the de-dupe class may be supported by logical drives 270B abstracted from physical storage drives 4Q.

Figure 3:
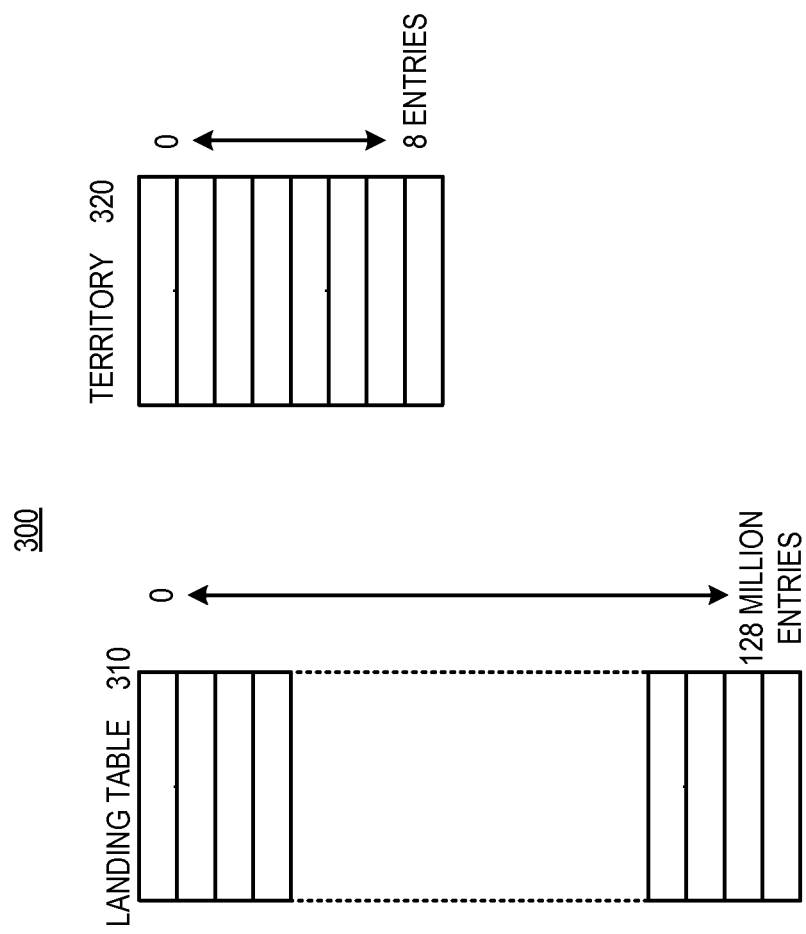
FIG. 3 is a block diagram illustrating storage structures used by a data de-duplication module according to an embodiment presented herein.

Referring now to FIG. 3, a block diagram 300 illustrates storage structures used by a data de-duplication module according to an embodiment presented herein. A landing table 310 can represent storage capacity within an entire storage system. Subdivisions of the storage capacity within a storage system can be referred to as territories which can be further subdivided into provisions. In one example embodiment, territories may each be 8 MB in size and provisions can be either 1 MB or 512 KB in size. Other sizes for territories and provisions may also be supported. Generally, the subdivisions of territories and provisions apply to both DVM class storage as well as de-duplication class storage. However, since provisions in the de-dupe environment may have a different size from those in the DVM environment, a convention may be adopted to refer to provisions within the de-duplication environment as regions.

The size of a region can be adjusted to support different size granularities. To maintain a reduced memory footprint for tracking regions, the regions can be tracked on a 1 MB basis. Other size regions may also be supported according to embodiments. A total storage capacity of 128 terabytes (TB) can be supported by dividing the capacity of the landing table 310 into 16 million territories 320 of 8 MB each. Each such territory 320 may be further subdivided into 8 regions of 1 MB each. Such a structure can support a total of 128 million regions of 1 MB each for a total capacity of 128 TB.

Figure 4:
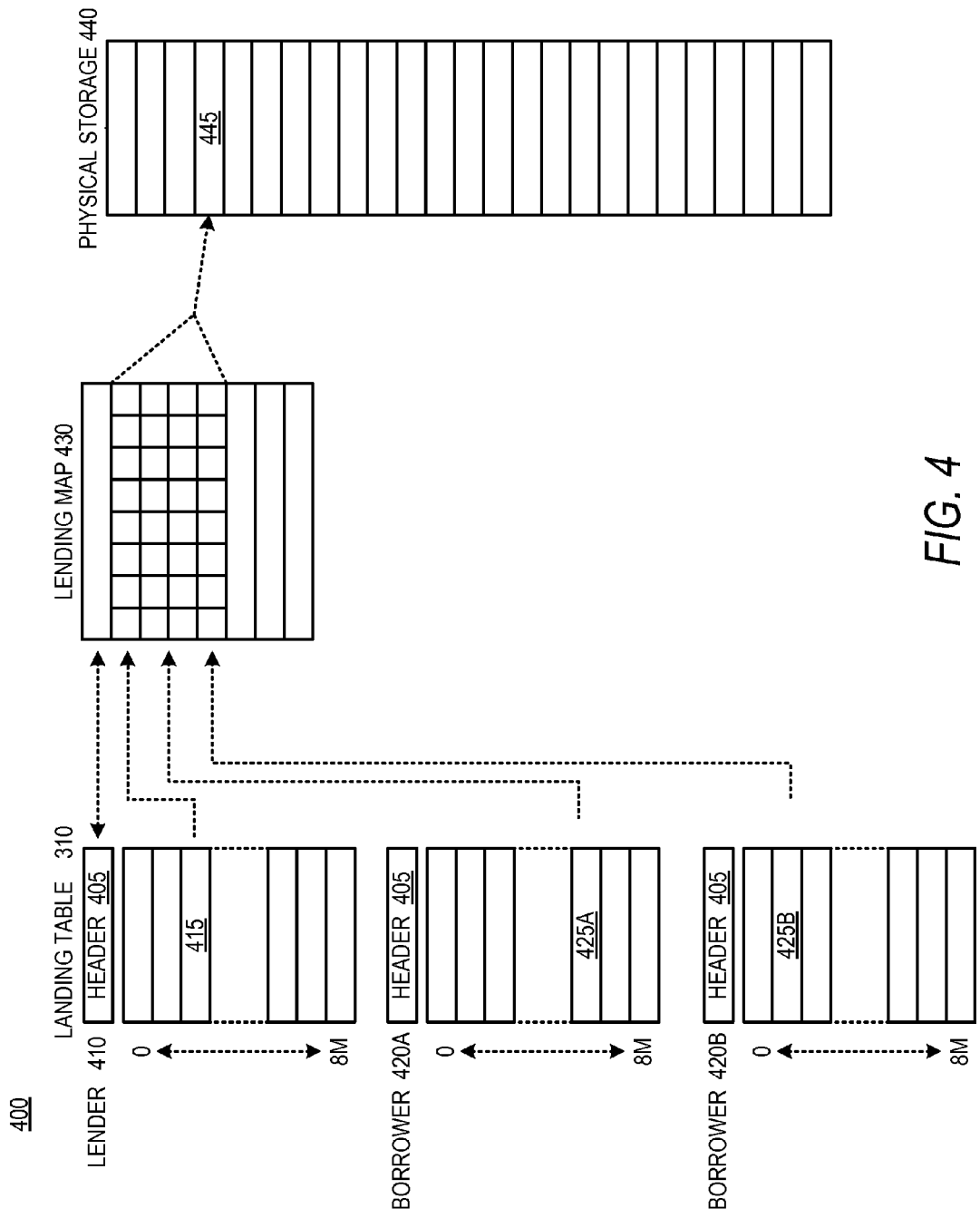
FIG. 4 is a block diagram illustrating storage structures used for region lending within a data de-duplication system according to an embodiment presented herein.

Referring now to FIG. 4, a block diagram 400 illustrates storage structures used for region lending within a data de-duplication system according to an embodiment presented herein. Each area of a landing table 310 representing a territory, or eight regions, can have a landing entry header 405. A lender territory 410 and a borrower territory 420 can contain data that is duplicated between the two territories. This duplicate data may be de-duplicated to improve storage capacity and efficiency. The lender territory 410 can contain the original instance of data from which other territories can borrow their matching data. The lender territory may have at least one lender region 415 that can be borrowed by other territories. A lender territory can have direct pointers to physical storage 440.

A borrower territory 420 can borrow data from a lender territory 410. A borrower territory 420 can have at least one borrower region 425 containing data that matches a corresponding lender region 415 in an associated lender territory 410. For example, the borrower territory 420A may have one borrower region 425A and borrower territory 420B may have one borrow region 425B. Both borrower region 425A and borrower region 425B can have data contents that match the corresponding lending region 415. Instead of having direct pointers to the physical storage 440, borrower territories 420 may have pointers to a lending map 430.

A lending map 430 data structure can be maintained for each lender territory 410. The lending map 430 can contain pointers to the original instance of data that is now shared from the lender territory 410 to the de-duplicated borrower territories 420. For example, physical region 445 may be shared by the lender territory 410 and two borrower territories 420A and 420B. The lending map 430 may also contain counters for tracking the number of borrowers associated with each lender region. These counters may be used to determine when dependencies on a given lender region are released and when dependencies are still in place.

According to one embodiment, four million lender territories 410 can be mapped using lending maps 430 of 256 bytes each. The memory footprint to manage such an arrangement of lender territories 410 can be calculated as four million times 256 bytes or, in total, 1 GB. These lending maps 430 can be stored on disk and cached in memory. The caching can follow an algorithm that tends to keep lending maps 430 loaded into memory when they are associated with a greatest number of borrowers and cover a complete 8 MB territory space.

Unclaimed storage capacity can be tracked and a region that has become unclaimed can be reclaimed by the tracking system. A de-dupe volume 230B can be a block storage device that may allocate space from physical storage 440 upon processing a write I/O operation. The de-dupe volume manager can divide the physical storage 440 into regions of 1 MB. Each region can be individually allocated as I/O writes arrive to the storage system. A conventional volume manager may defer freeing physical storage units until the entire volume is deleted since the volume manger may lack information as to when a physical allocation unit becomes completely freed. As such, the volume manager may generally perform a read-modify-write upon receiving a write I/O of a size smaller size than the region size even when the write is to a free region. By tracking free regions, the need for read-modify-write cycles while writing within a freed region may be avoided. This can improve performance, and support reusing freed regions when there is demand for physical storage capacity.

A volume formatted with a specific file system may support file system participation in allocating blocks from the volume and assigning those blocks to specific files. Operations at the file system layer can be trapped to support tracking file deletion calls. An interface to the file system, such as a file system application programming interface (API), may be used to identify blocks corresponding to a file being deleted by the file system. After the delete call is completed successfully, a de-duplication module 260 may mark regions associated with the identified blocks as free regions. Marking regions as free can support immediate writes by future write I/Os to one of the regions. In conventional implementations, where the freedom of regions may be unknown, read-modify-write operations will generally be performed for any write having a size less than a region size. Such a read-modify-write operation can involve reading the region from physical storage 440 into a memory buffer, modifying that buffer with the incoming write I/O operation, and finally performing a write of the region back to physical storage 440. The read and write will generally be the size of a region even if the write I/O involves a smaller size. These read-modify-write operations can degrade performance of a file system. When the de-duplication module 260 tracks the status of a region as free or not free, the read-modify-write cycle can be avoided. Instead, the write I/O operation may be directly applied to a free region.

Lender territories 410 and borrower territories 420 may be aligned on different sized boundaries to improve opportunities for matching data content between regions. For example, the lender territories 410 may be aligned on 4 KB boundaries while borrower regions 420 are aligned on boundaries according to the size of a storage region. Using such an alignment can leverage the 4 KB default block size of many databases systems. Similarly, high performance file systems may set a minimum default block size at 4 KB. Thus, 4 KB aligned lender territories 420 may support improved opportunities for identifying matching regions for de-duplication. Any other sizes or alignment intervals may be supported as well.

Figure 5:
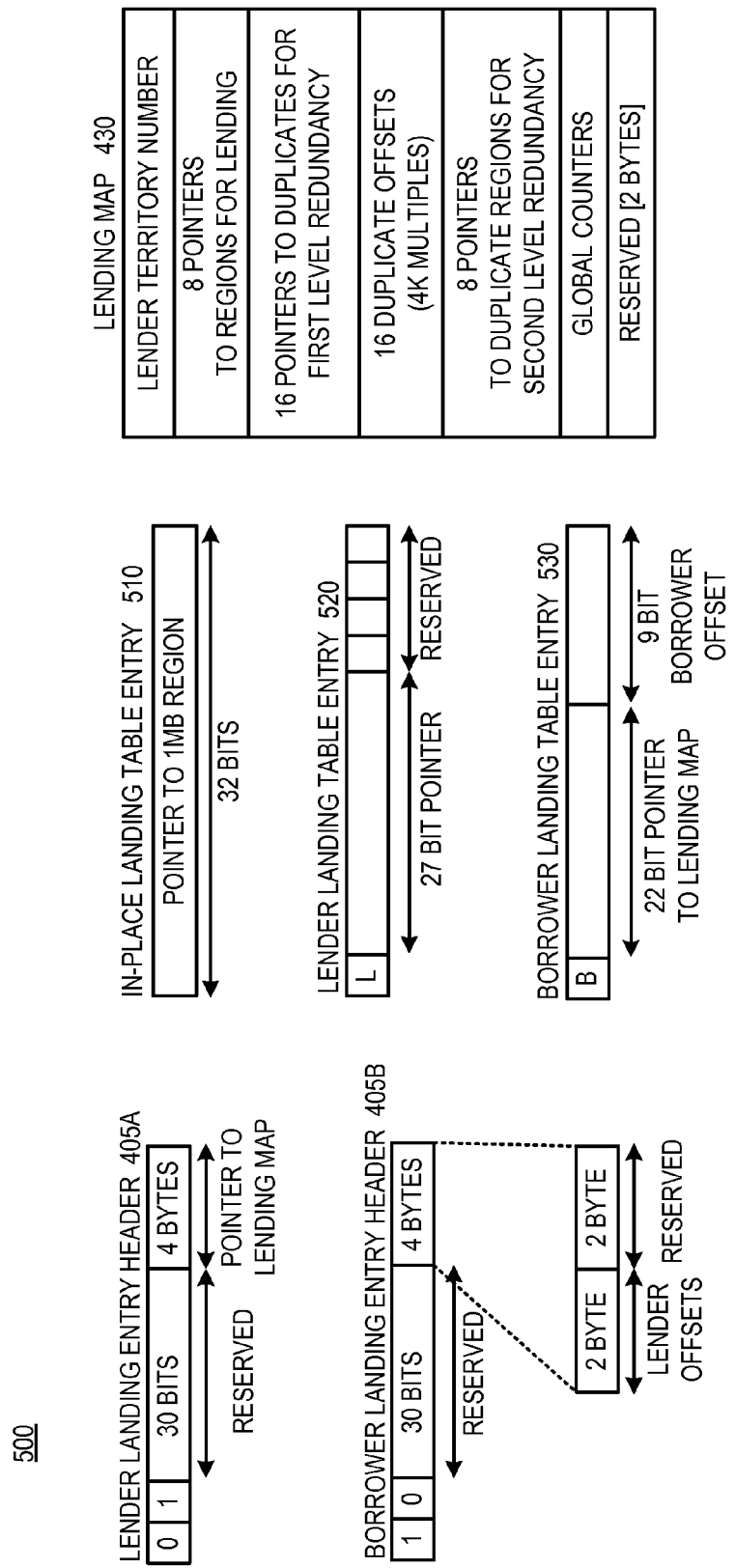
FIG. 5 is a data structure diagram illustrating several data structures used within a data de-duplication solution according to an embodiment presented herein.

Referring now to FIG. 5, a data structure diagram 500 illustrates several data structures used within a data de-duplication solution according to an embodiment presented herein. Each eight region block within a landing table 310 can have a landing entry header 405. Entry landing entry header 405 can correspond to a territory 320. The landing entry header 405 can denote whether its corresponding territory 320 is a normal territory, a lender territory 410, or a borrower territory 420. According to one example embodiment, the landing entry header 405 can be a 64 bit word where the first two bits of the landing entry header 405 may be set to "00" to designate a normal territory, set to "01" to designate a lender territory 410, or set to "10" to designate a borrower territory 420. For a territory to be identified as a lender territory 410 it should be lending at least one of its eight regions. Regions within a lender territory 410 that are not lent may be in-place regions that point directly to physical storage 440. Similarly, regions within a borrower territory 420 may be borrowed regions 425 that point indirectly to physical storage 440 through a lending map 430, or they may be in-place regions that point directly to physical storage 440. As such, when a write I/O operation arrives for a region which is not lent out or borrowed, the write operation may be directly performed to physical storage 440.

A lender landing entry header 405A can have its first two bits set to "01" to designate the associated territory as a lender territory 410. The next 30 bits of the lender landing entry header 405A may be reserved while the final four bytes, or 32 bits, may be a pointer the associated lending map 430. A borrower landing entry header 405B can have its first two bits set to "10" to designate the associated territory as a borrow territory 420. The next 30 bits of the borrower landing entry header 405B may be reserved, the next two bytes, or 16 bits, may indicate lender offsets, while the final two bytes, or 16 bits, may be reserved. The 16 bit lender offset vector may provide 2 bits of offset for each of the eight regions within the associated borrower territory 420.

Each landing entry header 405 within the landing table 310 may be followed by eight entries. These eight entries may each take on one of three forms. A normal entry that neither lends nor borrows may be represented by an in-place landing table entry 510. The in-place landing table entry 510 may contain a 32 bit pointer to a 1 MB region within the physical storage 440. An in-place landing table entry 510 within either a territory designated as a lending territory 410 or a territory designated as a borrowing territory 420 may have its first bit, or highest order bit, cleared to indicate that the region is not involved in lending or borrowing and is, in fact, a normal region pointer to physical storage 440.

A lender landing table entry 520 may be in a territory designated as a lender territory 410. The lender landing table entry 520 may have its first bit set to indicate that it is involved in lending. The next 27 bits may be a physical pointer indicating one of 128 million possible 1 MB regions in physical storage 440. The final four bits may be reserved.

A borrower landing table entry 530 may be in a territory designated as a borrower territory 420. The borrower landing table entry 530 may have its first bit set to indicate that it is borrowing from a lent region. The next 22 bits may be a pointer to the lending map that indicates where the borrowed region is stored in physical storage 440. The final nine bits may be used as a borrower offset to specify an offset within the associated lender where the de-duplicated data may be found.

A lending map 430 may be a 256 byte structure comprising several fields. For example, the lending map 430 may include a lender territory number. The lending map 430 may include eight pointers to regions for lending. Each of these pointers may be a pointer to physical storage 440 for the content of the 1 MB region being lent. The lending map 430 may support two levels of redundancy as discussed in further detail with respect to FIG. 8. In support of the first level of redundancy, the lending map 430 may provide 16 pointers to duplicate blocks where the content within the lent regions may be recovered in an instance where an original lent region suffers a media fault or other failure. The lending map 430 may also provide 16 offsets associated with these pointers. These offsets may be specified as multiples of 4 KB. In support of the second level of redundancy, the lending map 430 may provide eight pointers to duplicate regions where the data content of the lent regions may be recovered in the case of a media fault or other failure associated with one or more of the original lent regions. The lending map 430 may provide global counters for tracking how many borrowers are associated with each lent region.

Figure 6:
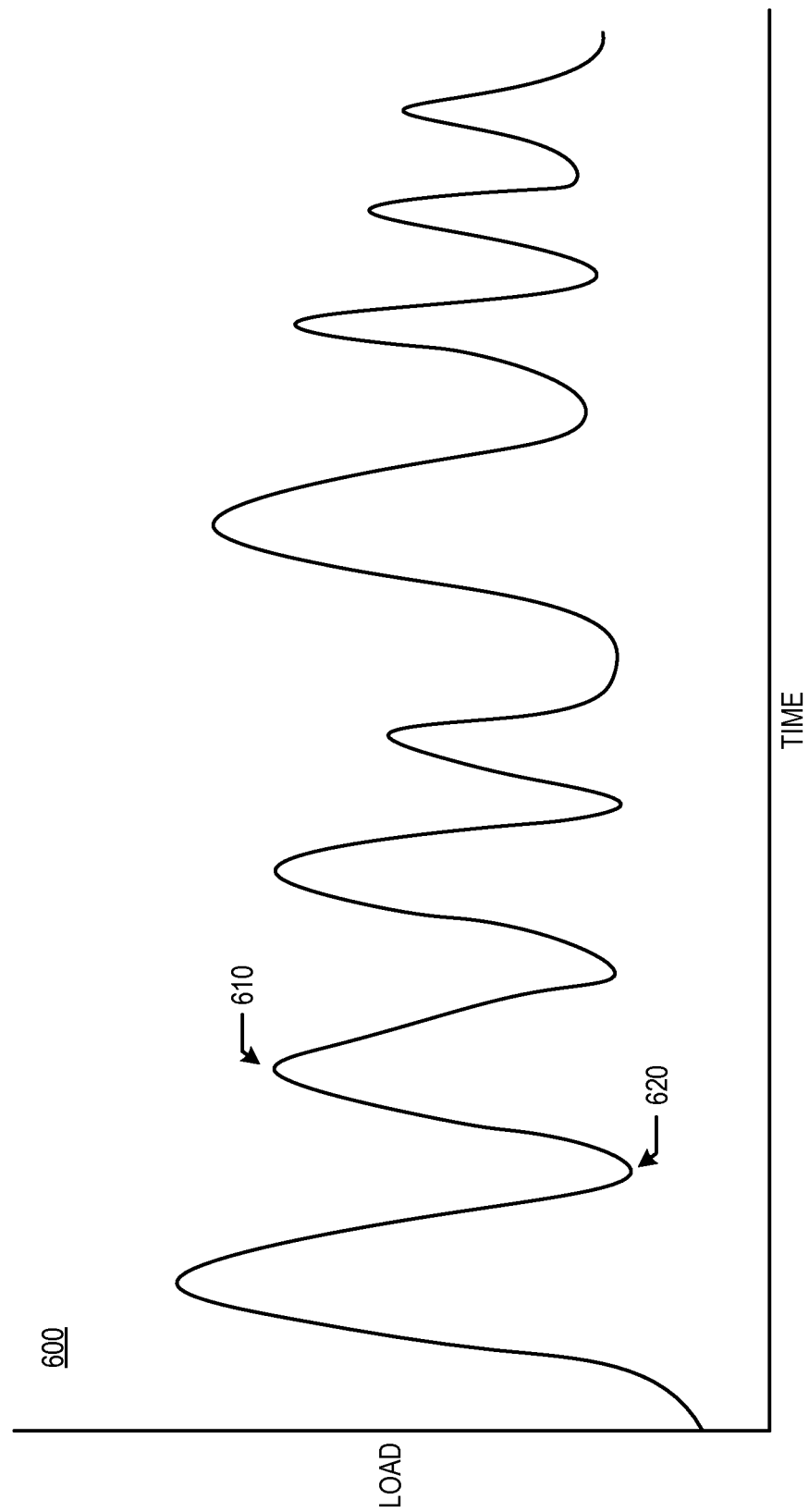
FIG. 6 is a system load plot illustrating data storage system load over time according to an embodiment presented herein.

Referring now to FIG. 6, a system load plot 600 illustrates data storage system load over time according to an embodiment presented herein. Information lifecycle management (ILM) and workflow management modules may inform de-duplication policies to support robust, scalable, and efficient operation. The policies may provide indicators as to which regions may be candidates for de-duplication and what times may be preferred for scheduling de-duplication operations to reduce undesirable impact on system performance.

De-duplication operations within a storage system can be supported through integration with Storage Resource Management (SRM) features provided within the storage system. SRM functions may include collecting and processing ILM statistics. SRM functions may also provide workflow management to support scheduling for background, or housekeeping, operations performed within the storage system.

SRM features can support de-duplication through access time ILM statistics. These statistics can support de-duplicating data in the reverse order of territories being accessed. Thus, the de-duplication process can take place first for regions that are not being actively used, or have the longest time recorded for their last access. This can reduce, or eliminate, de-duplication of frequently changing data. For performance reasons, it may not be preferable to de-duplicate frequently accessed data. For example, read access to a de-duped region may incur an extra disk or cache read to access the lending map 430 or other related structures as disclosed herein.

De-duplication may be CPU intensive or otherwise impact resources within a storage system. A workflow module within the storage system can support scheduling de-duplication operations. Scheduling de-duplication operation when load on the storage system is low can reduce, or alleviate, impact on production I/O operations of the storage system due to resource consumption by the de-duplication operations. For example, considering the system load plot 600, scheduling de-duplication operations at a time associated with a low point 620 in load may be preferable to scheduling de-duplication operation at a time associated with a high point 610 in the system load.

Figure 7:
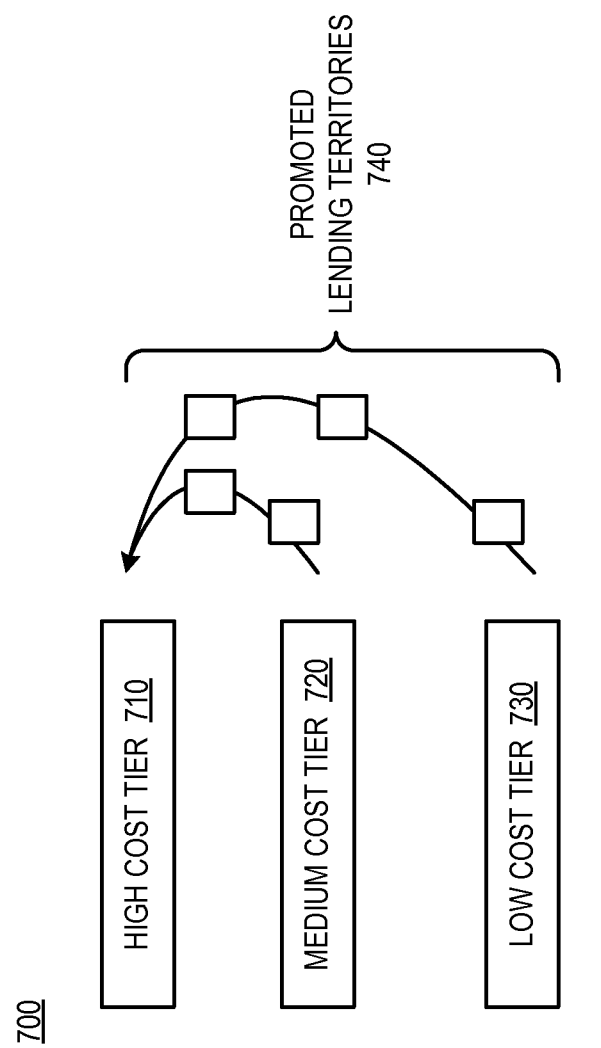
FIG. 7 is a block diagram illustrating territory migration between storage tiers according to an embodiment presented herein.

Referring now to FIG. 7, a block diagram 700 illustrates territory migration between storage tiers according to an embodiment presented herein. While de-duplication can provide the benefits of increased capacity, improved efficiency, improved caching, and so forth, one potential risk of de-duplication involves reduced data diversity. That is, having all the eggs in one basket when duplicated data is de-duplicated to fewer, or even just one, location. For example, when several subsequent backups share the same blocks as a first backup, an error in accessing the original instance of data can render all the subsequent backups unusable as well. To mitigate these risks, the lender data may be protected by inherent protective mechanisms within the data storage system. For example, RAID solutions may be leveraged to protect data. Tier migration may be used to transition lender territories 410 into storage tiers supported by higher levels of RAID protections. Also, explicit redundancy may be built into the de-duplication system as discussed in further detail with respect to FIG. 8.

Data de-duplication operation may inform a tier migration module. Lender territories 410 may be migrated from a lower cost tier to a higher cost tier as promoted lending territories 740. For example, lender territories 410 may be promoted from a low cost tier 730 and from a medium cost tier 720 into a high cost tier 710 by the tier migration module. Such migration can provide the enhanced data protection that may be available in the hardware of the high cost tier 710. For example, RAID 6 or RAID 5 technology may be offered in the high cost tier 710 but may not be available in the low cost tier 730. Regions for supporting redundancy, as discussed in further detail with respect to FIG. 8, may be allocated from the highest cost tier having available free space. Data migration between storage tiers may be scheduled for times of reduced system load as discussed with respect to FIG. 6.

Figure 8:
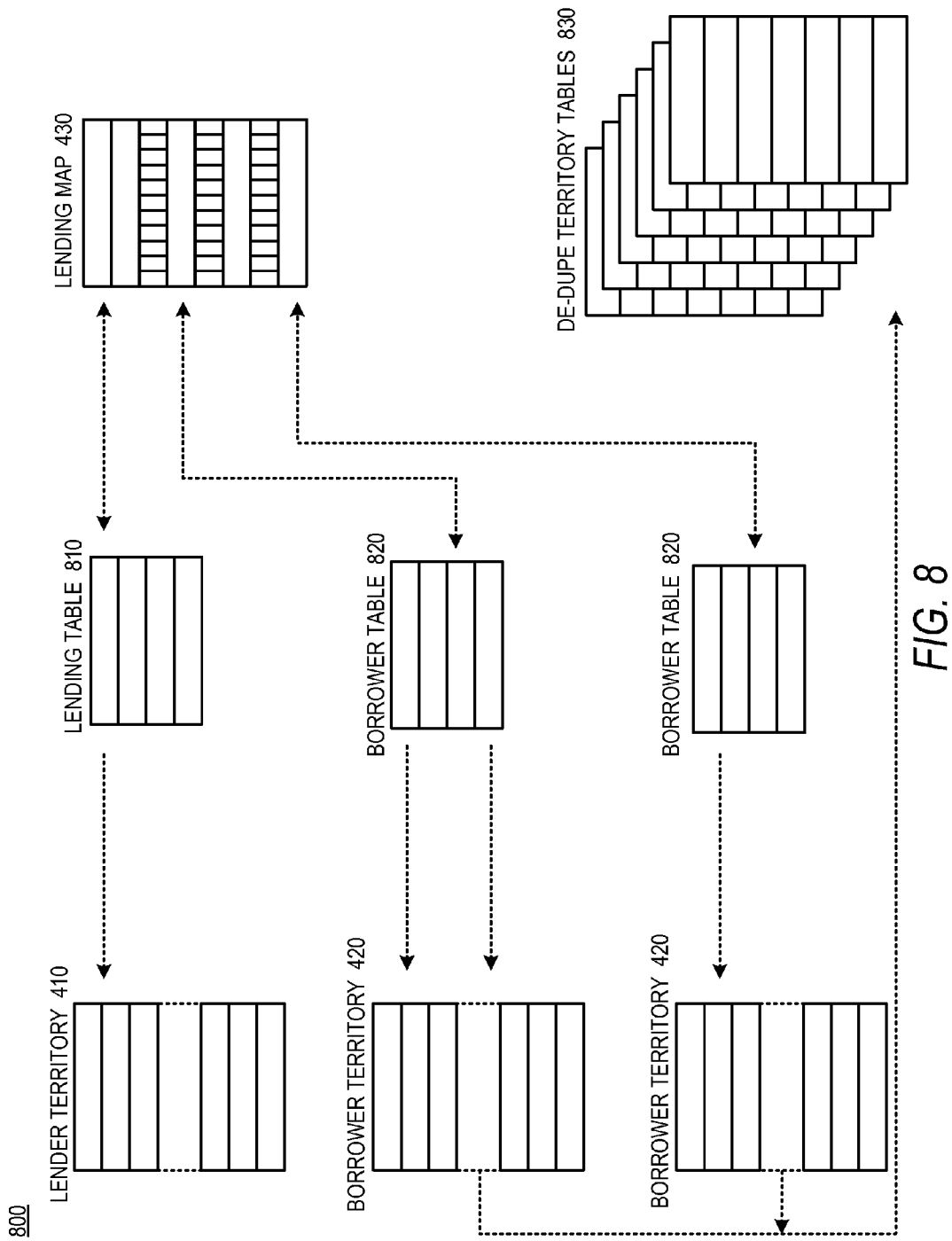
FIG. 8 is a data structure diagram illustrating tables used for delayed release data redundancy within a data de-duplication system according to an embodiment presented herein.

Referring now to FIG. 8, a data structure diagram 800 illustrates tables used for delayed release data redundancy within a data de-duplication system according to an embodiment presented herein. Media errors may be mitigated by providing data redundancy for de-duplicated regions. Protection providing two levels of redundancy may be implemented using a lending map 430 as discussed with respect to FIG. 5. The lending map 430 can provide pointers to the original source regions in physical storage 440. Additionally, the lending map 430 may support 16 pointers to duplicate 1 MB regions. The duplicate regions may originate from borrower regions 420. The duplicate region pointers in the lending map 430 may be selected such that the entire lender territory 410 is protected. The pointers may be specified with 4 KB offsets as discussed with respect to FIG. 5.

The second level of redundancy can be user configurable. When the user opts for a second level of redundancy, a duplicate copy can be made of the original territory into a duplicate 8 MB location. Doing so may increase the amount of storage by a factor of two, however an extra level of protection can then be provided against media errors. If a media error should occur, either the first level of redundancy or the second level of redundancy can satisfy a read I/O request. A consecutive write operation can be performed to a lender territory to provide a repair of the media error. If free space within the storage system becomes limited, a notification may be provided to a user, or administrator, to notify that the second level of redundancy may be removed. This can support the freeing up of storage capacity within the data storage system to provide space for fielding new writes I/O operations.

Multiple levels of redundancy can be supported using the same lending map 430 along with an additional set of tables. These additional tables can include a lending table 810 for each lender territory 410, a borrower table 820 for each borrower territory 420, and de-dupe territory tables 830 for tracking the free borrower territories 420.

When a duplicate region is found and de-duplicated, that region can be moved to a de-dupe territory table 830. The de-duplicated region is not freed immediately. Instead, the region can be freed when free space within the data storage system begins to run low. In the event of a media error to the original lender region, the de-dupe territory table 830 can be checked to determine if the de-duplicated region from one of the borrowers is still available. If so, the region from the de-dupe territory table 830 can be used to satisfy the read operation. A subsequent write to the lender region can attempt to repair the media error. Additional borrowers can effectively provide additional levels of redundancy. When a storage space becomes limited, the redundant borrower territories can be released from the de-dupe territory table 830 in the order of the least frequently accessed territories or region first. This mechanism of retaining de-duplicated regions until their space is actually needed, as opposed to instantly freeing the regions, may be referred to as "delayed release."

Figure 9:
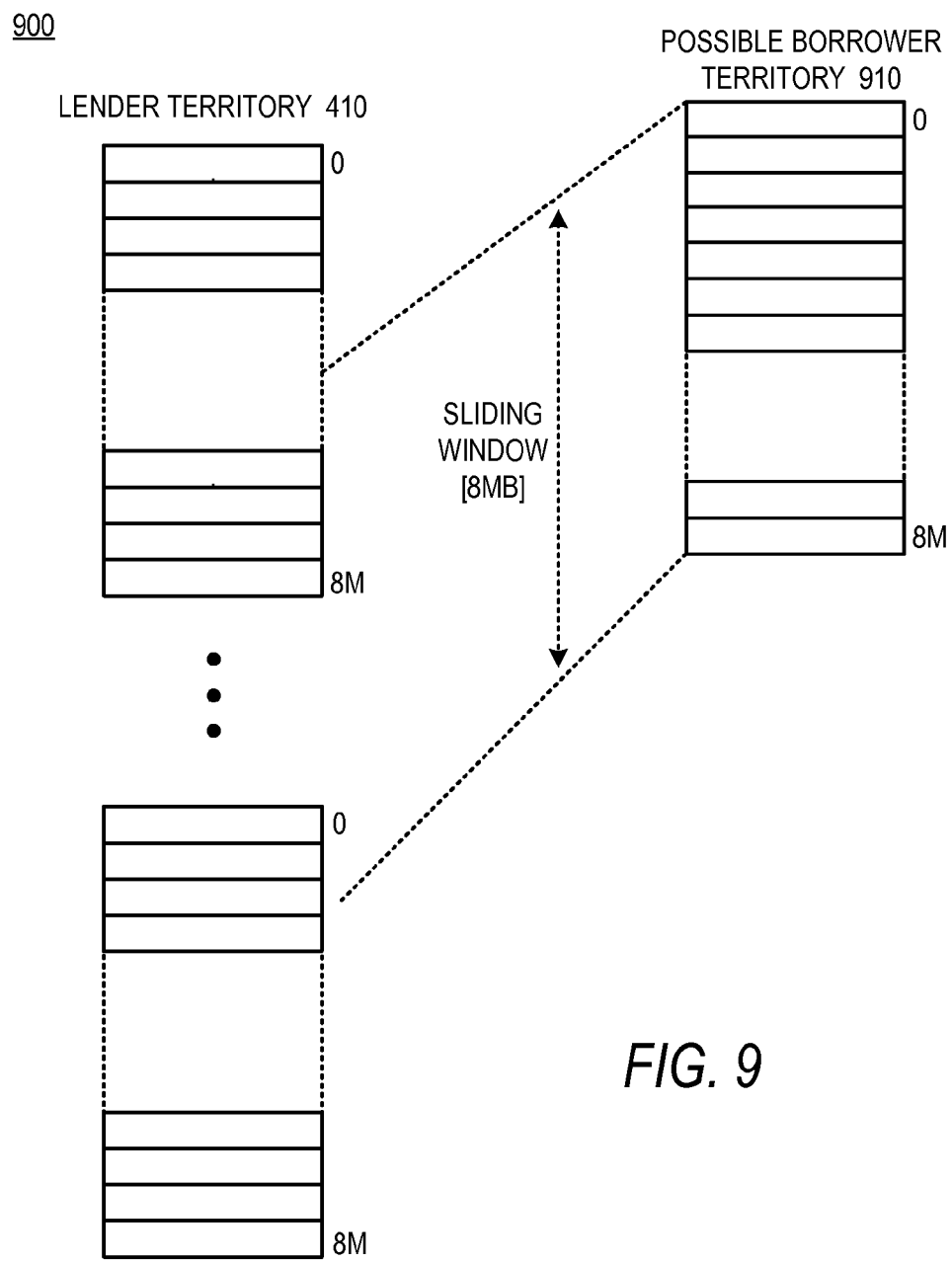
FIG. 9 is a block diagram illustrating checksum comparisons performed over data blocks from lenders and possible borrowers within a data de-duplication system according to an embodiment presented herein.

Referring now to FIG. 9, a block diagram 900 illustrates comparing checksums over data blocks from lenders and possible borrowers within a data de-duplication system according to an embodiment presented herein. Identifying duplicate regions can be computationally time consuming. As such, de-duplication may be performed as a background process or as a background thread. Candidate regions for de-duplication can be identified by calculating a signature for multiple regions and searching for matching signatures. A signature can be a cyclic redundancy check (CRC), a checksum, a hash, a repetition code, a parity code, a hamming code, a substitution code, or any other deterministic signature generated over the data within the provision. Alternatively, a specified sampling of the data may be used as a signature. Generally, a signature can be considerably smaller than the actual data within a region. The reduced size signature can provide a mechanism for quickly checking for data matches without doing a brute force comparison of every possible region with every other region. However, a brute force comparison may also be used according to embodiments.

The de-duplication module can efficiently identify duplicated regions by taking a territory as a lender territory 410 and comparing it with possible borrower territories 910. Possible borrower territories 910 can be those territories that have been selected as having an increased probability of containing duplicate instances of data. For example, specifying lender territories 410 and possible borrower territories 910 may be based on information provided by the ILM module or layer. The ILM module can inform the de-duplication module when data is written to the physical storage 440. Information can also be provided regarding patterns in the timing of write I/O events.

One example of using write I/O timing and patterns to inform de-duplication can involve backup operations or write streams. Territories having time stamps that are close to each other can be considered part of a single backup operation or data write stream. Territories whose time stamps change significantly from a previous set may be considered part of a new backup operation or data write stream. There may be an increased likelihood of duplicated data existing between multiple backups or write streams. Thus, a first write stream of data may be specified as a lender and then subsequent streams may be examined as possible borrowers. Consideration may also be given to possible duplicated data within a single stream.

Once a lender territory 410 and a possible borrower territory 910 have been identified, examinations may be made to identify regions having duplicate data. These duplicated regions may then be de-duplicated. Signatures may be generated for blocks of data and then compared to identify which data blocks are a match. As one example, the signature may be a checksum. According to one embodiment, signatures can be generated for four data blocks of 4 KB in size that are spaced at predefined intervals within a lender region 415. The generated signatures can be stored in a hash table. Next, each possible borrower territory 910 may be scanned with a signature generated for every 4 KB block. Such an arrangement can check 32 signatures from the lender territory 410 against 2048 signatures from the possible borrower territory 910 over an 8 MB sliding window. Other quantities or ratios of lender to borrower signatures may be generated for hash comparison according to embodiments. Using a smaller number of lender territory 410 signatures may still provide a good sampling of information to describe the data present in the territory while reducing the search processes and associated memory footprint.

Signatures from a possible borrower territory 910 can be compared with those generated for a lender territory 410. First, a single signature from the possible borrower territory 910 can be compared against a single signature from the lender territory 410. If a match is identified, the next signature from the possible borrower territory 910 can be calculated starting at the current address plus the predefined sampling interval. This next signature from the possible borrower territory 910 can be compared against the next signature in the hash of signatures for the lender territory 410. As matching continues, additional signatures over the pre-defined interval within the possible borrower territory 910 can be computed and compared with signatures from the lender territory 410. If a match crosses a region boundary, a more detailed data comparison of the lender region and borrower region can be performed. If the regions are a match, de-duplication can occur where the two regions are marked as duplicate regions and the mapping tables are updated accordingly. The entire process of detecting duplicates may be performed recursively. At later iterations, the scanning for duplicates may be performed on an incremental basis where only the newly allocated regions may be scanned.

Figure 10:
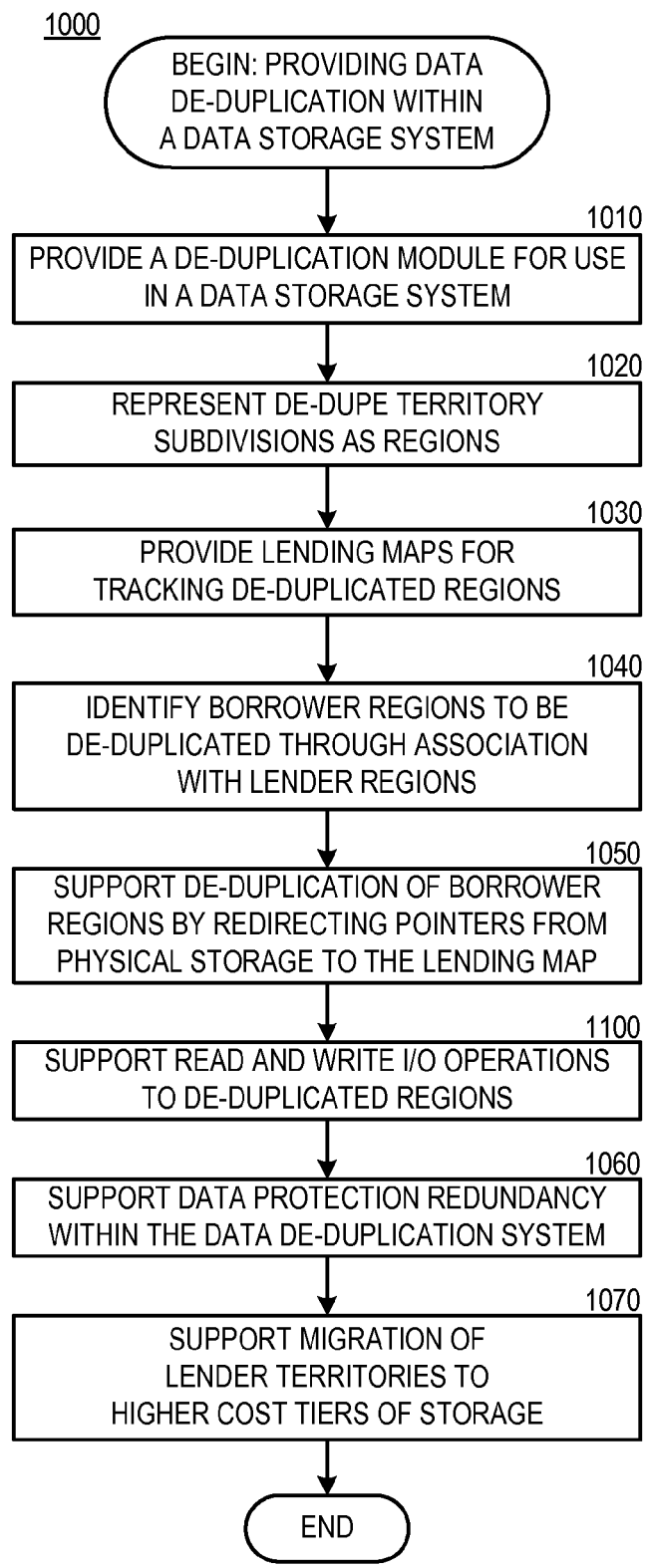
FIG. 10 is a logical flow diagram illustrating a process for providing data de-duplication within a data storage system according to an embodiment presented herein.

Turning now to FIG. 10, additional details will be provided regarding the embodiments presented herein for eliminating duplicated data within a data storage system. In particular, FIG. 10 is a flow diagram showing a routine 1000 that illustrates aspects of a process for providing data de-duplication within a data storage system according to one exemplary embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 1000 can begin with operation 1010 where a de-duplication module 260 can be provided for use within a data storage system. In operation 1020, subdivisions of de-duplication territories can be represented as regions. These regions may be 1 MB in size or any other size according to embodiments.

In operation 1030, lending maps 430 can be provided to track de-duplicated regions. A lending map 430 can track redirected pointers from borrower territories to regions 445 within physical storage 440 originally associated with a lender region 415. In operation 1040, borrower regions 425 can be identified to be de-duplicated through association with lender regions 415. The identification of borrower regions 425 that are duplicates of lender regions 415 can use a recursive signature based search and matching approach such as the one described with respect to FIG. 9.

In operation 1050, de-duplication of borrow regions 425 can be supported by redirecting pointers from physical storage 440 to the lending map 430. This redirection can indirectly point from the borrower region 425 to the region 445 within the physical storage 440 associated with the lender region 415.

Routine 1100 can provide support for reading and writing to de-duplicated regions. Details related to routine 1100 are presented with respect to FIG. 11. In operation 1060, data protection redundancy can be supported within a data de-duplication system. Explicit redundancy may be built into the de-duplication system as discussed in further detail with respect to FIG. 8.

In operation 1070, lender territories 410 may be migrated from a lower cost tier to a higher cost tier as promoted lending territories 740. For example, lender territories 410 may be promoted from a low cost tier 730 and from a medium cost tier 720 into a high cost tier 710 by the tier migration module. Such migration can provide the enhanced data protection that may be available in the hardware of the high cost tier 710. The routine 1000 can terminate after operation 1070.

Figure 11:
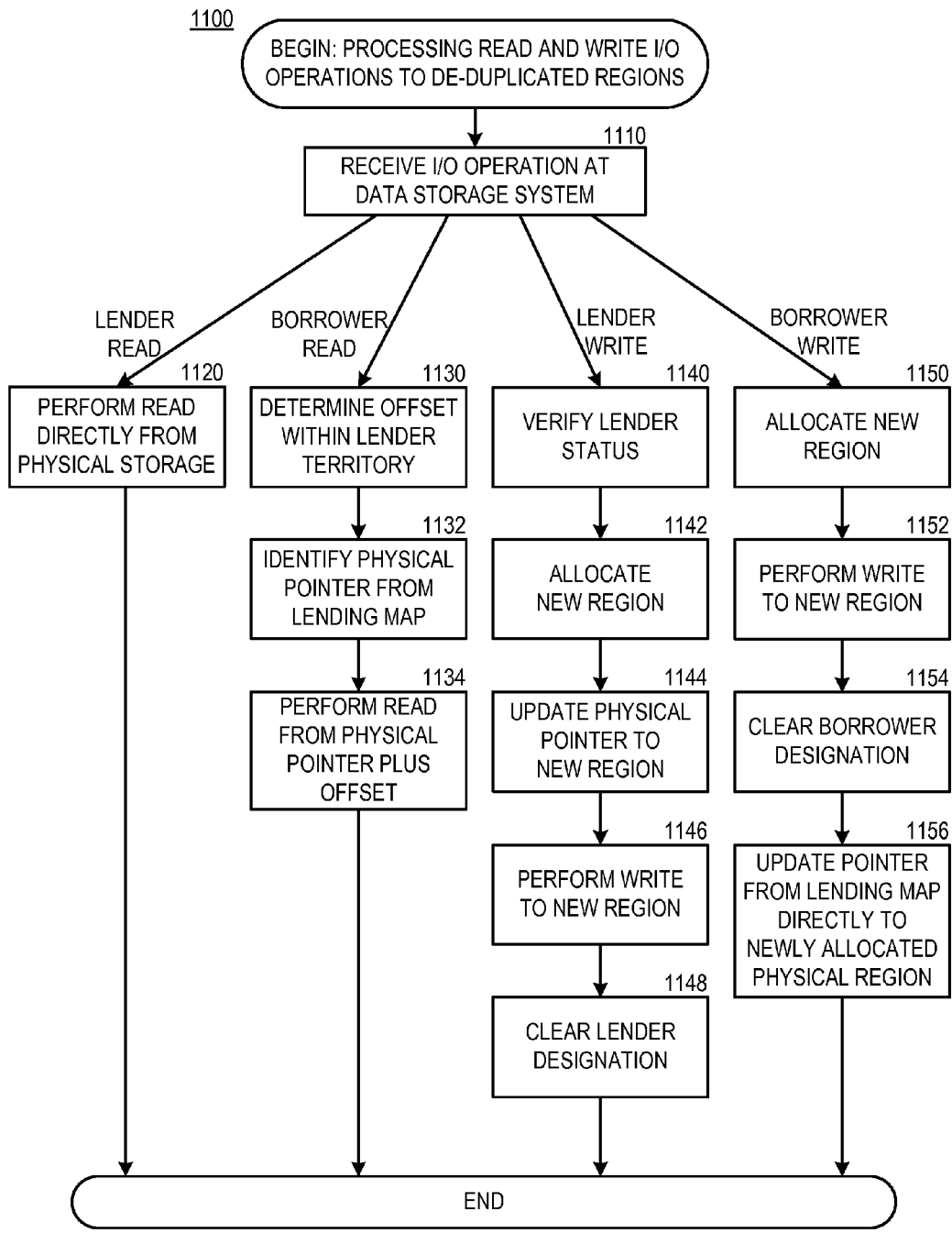
FIG. 11 is a logical flow diagram illustrating a process for handling read and write operation to de-duplicated data regions according to an embodiment presented herein.

Turning now to FIG. 11, additional details will be provided regarding the embodiments presented herein for eliminating duplicated data within a data storage system. In particular, FIG. 11 is a flow diagram illustrating a routine 1100 that shows aspects of a process for handling read and write operation to de-duplicated data regions according to one exemplary embodiment. The routine 1100 can begin with operation 1110 where an I/O operation can be received at the data storage system. Depending on the type of I/O operation received, the routine 1100 can branch forward to one of four next operations.

If the received I/O is for a read from a lender region, the routine 1100 can continue to operation 1120 where the read can be performed directly from physical storage 440. Since a lender region 415 can support a direct pointer to physical storage and a read operation will not modify that storage, the read operation may be performed directly. The routine 1100 can terminate after operation 1120.

If the received I/O is for a read from a borrower region, the routine 1100 can continue to operation 1130 where an offset within a lender territory can be determined. For example, a borrower landing table entry 530 may be read from the landing table 310. A pointer to a lending map 430 and a borrower offset value may be extracted from the borrower landing table entry 530. At operation 1132, the lending map 430 may be accessed to identify a pointer into physical storage 440 associated with a lender region 415 from which the borrower region 425 has been de-duplicated. At operation 1134, the read operation may be performed from the pointer into physical storage 440 plus the offset value. The routine 1100 can terminate after operation 1134.

If the received I/O is for a write to a lender region, the routine 1100 can continue to operation 1140 where the lender status of the region can be verified. If there are no current borrowers associated with the lender region 415, the write can be made directly to physical memory 440. However, if there are one or more borrower regions 425 associated with the lender region 415, a new region can be allocated from a free region within the physical storage 440 in operation 1142. The in operation 1144, the physical pointer associated with the lender region 415 can be updated to point to the newly allocated region. In operation 1146, the write I/O operation can be performed to the newly allocated region in physical storage 440. In operation 1148, the lender bit can be cleared in the lender landing table entry 520 to indicate that the lending region is no longer involved in lending. The new write to the lender region has caused the de-duplicated lender and borrowers to diverge in content through the allocation of a new region in physical storage 440. The routine 1100 can terminate after operation 1148.

If the received I/O is for a write to a borrower region, the routine 1100 can continue to operation 1150 where a new region can be allocated from physical storage 440. In operation 1152, the write operation can be performed within the newly allocated region from operation 1150. In operation 1154, the borrower bit may be cleared within the borrower landing table entry 530 to indicate that the borrower region 425 is no longer borrowed from a lender region. In operation 1156, the pointer in the borrower landing table entry 530 can be updated from an indirect lending map pointer to a direct pointer to physical storage 440 at the location of the newly allocated region from operation 1150. The routine 1100 can terminate after operation 1156.

Figure 12:
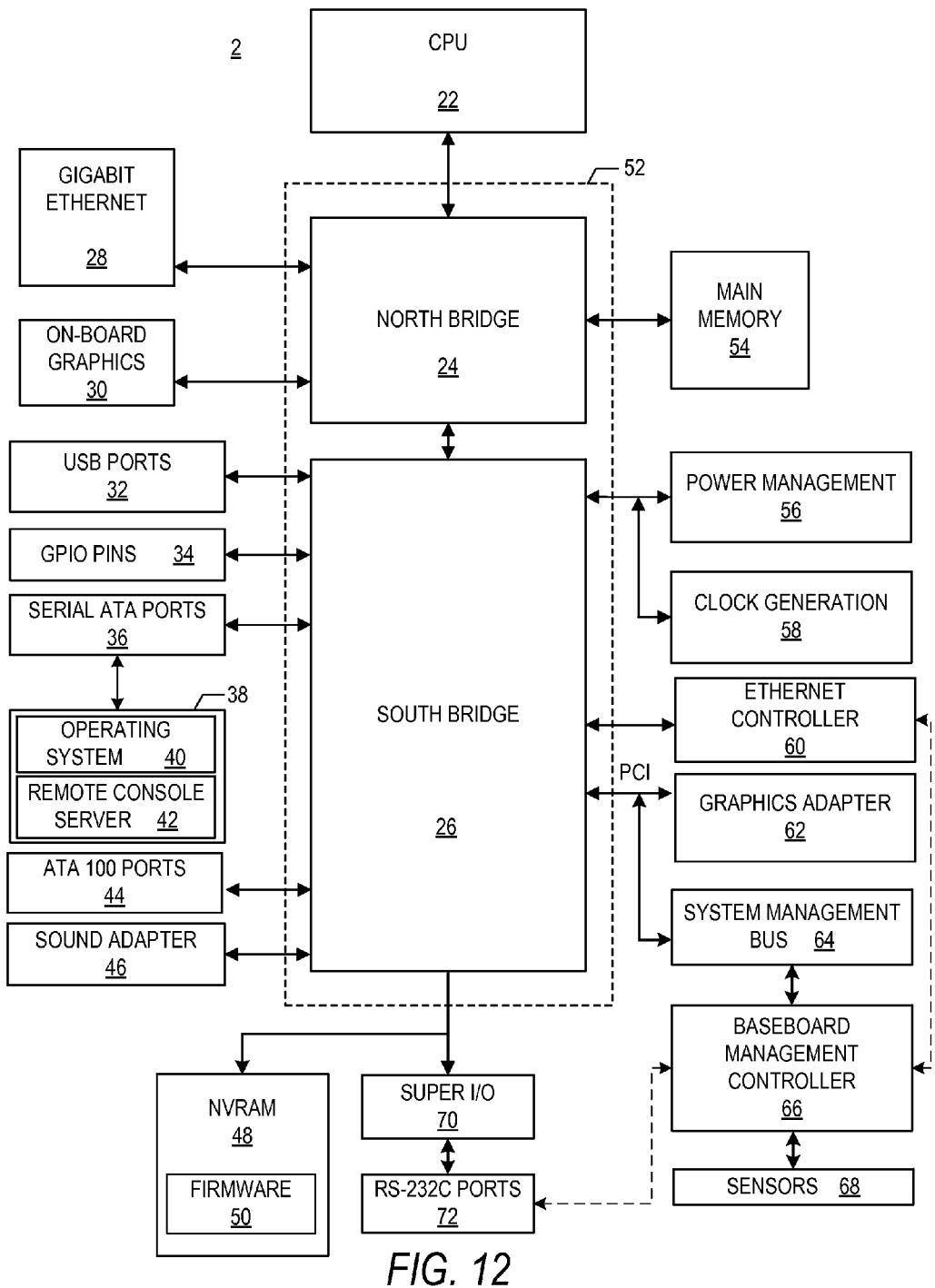
FIG. 12 is a computer architecture diagram illustrating a computer hardware architecture for a computing system capable of eliminating duplicate regions within a data storage system according to an embodiment presented herein.

FIG. 12 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 12 shows an illustrative computer architecture for a storage server computer 2 that may be utilized in the implementations described herein. Such an illustrative computer system may also describe a client computer system 8A-8N. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory (RAM) used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus (USB) ports 32, a sound adapter 46, an Ethernet controller 60, and one or more general purpose input/output (GPIO) pins 34. The south bridge 26 may also provide a bus for interfacing peripheral card devices such as a graphics adapter 62. In one embodiment, the bus comprises a peripheral component interconnect (PCI) bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment (SATA) adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 12, may include other components that are not explicitly shown in FIG. 12, or may utilize an architecture completely different than that shown in FIG. 12.

Based on the foregoing, it should be appreciated that technologies for eliminating duplicated data within a data storage system are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for removing duplicate data within a data storage system, the method comprising:
   identifying duplicated data within the data storage system as a first instance of the duplicated data and a second instance of the duplicated data;
   designating a storage territory associated with the first instance of the duplicated data as a lender territory comprising regions;
   providing a lending map associated with the lender territory;
   subdividing a physical storage resource into regions;
   providing a lender landing table associated with the lender territory, the lender landing table comprising a lender landing table entry comprising a pointer to specify the lending map associated with the lender territory;
   providing a plurality of pointers within the lending map, each of the pointers specifying a physical storage region of the lender territory, wherein one of the pointers within the lending map specifies a physical storage region comprising the first instance of the duplicated data;
   providing a plurality of duplicate pointers within the lending map, each of the duplicate pointers specifying a duplicate physical storage region corresponding to the physical storage region of the lender territory;

designating a storage territory associated with the second instance of the duplicated data as a borrower territory comprising regions; and providing a borrower landing table associated with the borrower territory, the borrower landing table comprising a borrower landing table entry comprising a pointer to specify the lending map associated with the lender territory and an offset to specify a location of duplicated data within the lending territory, wherein the borrower landing table entry associates a region of the borrower territory comprising the second instance of the duplicated data with the physical storage region comprising the first instance of the duplicated data through the lending map.

2. The method of claim 1, further comprising maintaining a counter associated with the lender territory to track a number of borrowers associated with the lender territory.

3. The method of claim 1, further comprising maintaining a redundant copy of the physical storage region comprising the first instance of the duplicated data.

4. The method of claim 1, further comprising maintaining the region of the borrower territory comprising the second instance of the duplicated data as a redundant copy.

5. The method of claim 4, further comprising freeing the redundant copy in response to a measure of free space within the data storage system being less than a specified threshold.

6. The method of claim 1, further comprising migrating the lender territory to a higher cost tier of storage.

7. The method of claim 1, wherein identifying duplicated data comprises comparing signatures of potential lender regions against signatures of potential borrower regions.

8. A non-transitory computer storage medium having computer-executable instructions stored thereon which, when executed by a computer system, cause the computer system to:

identify duplicated data within the data storage system as a first instance of the duplicated data and a second instance of the duplicated data;

designate a storage territory associated with the first instance of the duplicated data as a lender territory comprising regions;

provide a lending map associated with the lender territory;

subdivide a physical storage resource into regions;

provide a lender landing table associated with the lender territory, the lender landing table comprising a lender landing table entry comprising a pointer to specify the lending map associated with the lender territory;

provide a plurality of pointers within the lending map, each of the pointers specifying a physical storage region of the lender territory, wherein one of the pointers within the lending map specifies a physical storage region comprising the first instance of the duplicated data;

provide a plurality of duplicate pointers within the lending map, each of the duplicate pointers specifying a duplicate physical storage region corresponding to the physical storage region of the lender territory;

designate a storage territory associated with the second instance of the duplicated data as a borrower territory comprising regions; and provide a borrower landing table associated with the borrower territory, the borrower landing table comprising a borrower landing table entry comprising a pointer to specify the lending map associated with the lender territory and an offset to specify a location of duplicated data within the lending territory, wherein the borrower landing table entry associates a region of the borrower territory comprising the second instance of the duplicated data with the physical storage region comprising the first instance of the duplicated data through the lending map.

9. The non-transitory computer storage medium of claim 8, further comprising causing the computer system to maintain a counter associated with the lender territory to track a number of borrowers associated with the lender territory.

10. The non-transitory computer storage medium of claim 8, further comprising causing the computer system to maintain a redundant copy of the physical storage region comprising the first instance of the duplicated data.

11. The non-transitory computer storage medium of claim 8, further comprising causing the computer system to maintain the region of the borrower territory comprising the second instance of the duplicated data as a redundant copy.

12. The non-transitory computer storage medium of claim 11, further comprising causing the computer system to free the redundant copy in response to a measure of free space within the data storage system being less than a specified threshold.

13. The non-transitory computer storage medium of claim 8, wherein identifying duplicated data comprises comparing signatures of potential lender regions against signatures of potential borrower regions.

14. The non-transitory computer storage medium of claim 8, further comprising causing the computer system to collect information lifecycle statistics related to the data storage system.

15. The non-transitory computer storage medium of claim 14, further comprising causing the computer system to schedule a de-duplication operation during a period of reduced system load as inferred from the collected information lifecycle statistics.

16. The non-transitory computer storage medium of claim 14, further comprising causing the computer system to schedule migration of the lender territory to a higher cost tier of storage during a period of reduced system load as inferred from the collected information lifecycle statistics.

17. The non-transitory computer storage medium of claim 14, further comprising causing the computer system to identify de-duplication candidates in response to patterns in the collected information lifecycle statistics.

18. A data storage system comprising:

a storage server;

a physical storage device associated with the storage server;

a processing unit associated with the storage server;

and one or more modules for execution on the processing unit, operable to:

identify duplicated data within the data storage system as a first instance of the duplicated data and a second instance of the duplicated data;

designate a storage territory associated with the first instance of the duplicated data as a lender territory comprising regions;

provide a lending map associated with the lender territory;

subdivide a physical storage resource into regions;

provide a lender landing table associated with the lender territory, the lender landing table comprising a lender landing table entry comprising a pointer to specify the lending map associated with the lender territory;

provide a plurality of pointers within the lending map, each of the pointers specifying a physical storage region of the lender territory, wherein one of the pointers within the lending map specifies a physical storage region comprising the first instance of the duplicated data;

provide a plurality of duplicate pointers within the lending map, each of the duplicate pointers specifying a duplicate physical storage region corresponding to the physical storage region of the lender territory;

designate a storage territory associated with the second instance of the duplicated data as a borrower territory comprising regions; and provide a borrower landing table associated with the borrower territory, the borrower landing table comprising a borrower landing table entry comprising a pointer to specify the lending map associated with the lender territory and an offset to specify a location of duplicated data within the lending territory, wherein the borrower landing table entry associates a region of the borrower territory comprising the second instance of the duplicated data with the physical storage region comprising the first instance of the duplicated data through the lending map.

19. The data storage system of claim 18, wherein the one or more modules for execution on the processing unit are further operable to maintain a redundant copy of the physical storage region comprising the first instance of the duplicated data.

20. The data storage system of claim 18, wherein the one or more modules for execution on the processing unit are further operable to migrate the lender territory to a higher cost tier of storage within the data storage system.

\* \* \* \* \*